US012663389B2

(12) United States Patent
Bourhis et al.

(10) Patent No.: US 12,663,389 B2
(45) Date of Patent: Jun. 23, 2026

(54) SYSTEM AND METHOD FOR DIFFRACTION-BASED STRUCTURE DETERMINATION WITH SIMULTANEOUS PROCESSING MODULES

(71) Applicant: Bruker AXS, LLC, Madison, WI (US)

(72) Inventors: Luc Bourhis, Antony (FR); Jörg Kärcher, Madison, WI (US); Michael Ruf, Madison, WI (US)

( * ) Notice: Subject to any disclaimer, the term of this patent is extended or adjusted under 35 U.S.C. 154(b) by 455 days.

(21) Appl. No.: 17/603,097

(22) PCT Filed: Apr. 12, 2019

(86) PCT No.: PCT/US2019/027280
§ 371 (c)(1),
(2) Date: Oct. 12, 2021

(87) PCT Pub. No.: WO2020/209868
PCT Pub. Date: Oct. 15, 2020

(65) Prior Publication Data
US 2022/0187226 A1      Jun. 16, 2022

(51) Int. Cl.
G01N 23/2055 (2018.01)

(52) U.S. Cl.
CPC ... G01N 23/2055 (2013.01); *G01N 2223/056* (2013.01); *G01N 2223/304* (2013.01); *G01N 2223/306* (2013.01); *G01N 2223/60* (2013.01)

(58) Field of Classification Search
CPC ......... G01N 23/2055; G01N 2223/056; G01N 2223/304; G01N 2223/306; G01N 2223/60; G06F 9/46
See application file for complete search history.

(56) References Cited

U.S. PATENT DOCUMENTS

| | | | | |
|---|---|---|---|---|
| 2004/0015828 A1* | 1/2004 | MacKaie | ................. | G06F 8/36 717/107 |
| 2006/0029184 A1* | 2/2006 | Lin | ..................... | G01N 23/207 378/73 |

(Continued)

FOREIGN PATENT DOCUMENTS

| | | | | |
|---|---|---|---|---|
| EP | 2246786 A1 * | 11/2010 | ............. | G06F 9/544 |

OTHER PUBLICATIONS

Powell, "X-ray data processing," Bioscience Reports, 37(5), BSR2017022 (Year: 2017).*

(Continued)

*Primary Examiner* — Lee E Rodak
*Assistant Examiner* — Sangkyung Lee
(74) *Attorney, Agent, or Firm* — DECODE Legal Inc.

(57) ABSTRACT

A diffraction system for determining a crystalline structure of a sample collects a series of diffraction frames from a crystal sample illuminated by a beam of photonic or particulate radiation, such as X-rays. A plurality of software modules for processing the detected diffraction frames perform different tasks in refining the collected diffraction data, such as harvesting, indexing, scaling, integration, and structure determination. Output parameters from certain modules are used as input parameters in others, and are exchanged between the modules as they become available. The modules operate simultaneously, and generate successive versions of output parameters as corresponding input parameters are changed until a final result is achieved. This provides a system of structure determination that is fast and efficient.

28 Claims, 7 Drawing Sheets

(56) References Cited

U.S. PATENT DOCUMENTS

| | | | | |
|---|---|---|---|---|
| 2006/0235020 | A1* | 10/2006 | Kim | A61P 37/06 |
| | | | | 544/183 |
| 2011/0231865 | A1* | 9/2011 | Dorn | G06F 9/44 |
| | | | | 719/328 |
| 2015/0346121 | A1* | 12/2015 | Giencke | G01B 9/02018 |
| | | | | 378/74 |
| 2017/0255885 | A1* | 9/2017 | Whiteside | G06Q 10/06 |

OTHER PUBLICATIONS

P. D. Adams et al., "PHENIX: a comprehensive Python-based system for macromolecular structure solution", Acta Cryst. (2010). D66, pp. 213-221.

Auto-Rickshaw: http://www.embl-hamburg.de/Auto-Rickshaw/ (retrieved: Sep. 24, 2021).

J. Holton et al., "Automated protein crystal structure determination using ELVES", NAS, Feb. 10, 2004, vol. 101 , No. 6, pp. 1537-1542.

T.C. Terwillinger et al., "Automated MAD and MIR structure solution", Acta Crystallographica, D55 (1999), pp. 849-861.

T.C. Terwillinger, "Maximum likelihood density modification", Acta Crystallographica, D56 (2000), pp. 965-972.

T.C. Terwillinger, "Automated main-chain model building by template matching and iterative fragment extension", Acta Crystallographica, D59 (2003), pp. 38-44.

G. Langer et al., "Automated macromolecular model building for X-ray crystallography using ARP/wARP version 7", Nat Protoc. (2008), vol. 3(7), pp. 1171-1179.

ACMI: http://research.cs.wisc.edu/acmi/ (retrieved Sep. 24, 2021).

AutoChem2.0: https://www.agilent.com/cs/library/posters/Public/AutoChem%202.0%20-%20BCA%202012%20Poster_HR.pdf (retrieved Sep. 24, 2021).

W. Minor et al., "HKL-3000: the integration of data reduction and structure solution—from diffraction images to an Initial model in minutes," Acta Crystallographa, vol. 62, No. 8, 2006, pp. 859-866.

C.A.R. Hoare, "Communicating Sequential Processes," Communications of the ACM, vol. 21, No. 8, 1978, pp. 666-677.

Bruker AXS GmbH, DIFFRAC.TEXTURE Brochure, https://my.bruker.com/acton/attachment/2655/f-Oeld/I/-/-/-/-/XRD%20DIFFRAC.TEXTURE%20Flyer%20DOC-H88-EXS078%20high.pdf, (retrieved on Dec. 12, 2019), pp. 1-4.

I. Steller et al, An Algorithm for Automatic Indexing of Oscillation Images using Fourier Analysis, J. Appl. Cryst. (1997), 30, 1036-1040.

Z. Dauter, Data-collection strategies, Acta Cryst. (1999), D55, 1703-1717.

R. H. Blessing, An empirical correction for absorption anisotropy, Acta Cryst. (1995), A51, 33-38.

G. M. Sheldrick, SHELXT—Integrated space-group and crystal-structure determination, Acta Cryst. (2015), A71, 3-8.

J. Kaercher et al, A Relational Database Approach to Report Generation, Acta Cryst. (2005), A61, C110.

* cited by examiner

SYSTEM AND METHOD FOR DIFFRACTION-BASED STRUCTURE DETERMINATION WITH SIMULTANEOUS PROCESSING MODULES

BACKGROUND OF THE INVENTION

Field of the Invention

This invention relates generally to the field of diffraction systems for structure determination and, more specifically, to process flow control for crystal structure determination using a diffractometer.

Description of the Related Art

Diffractometry, such as single-crystal X-ray diffraction (SC-XRD), is a method for determining the three-dimensional atomic structure of a crystalline compound. A single-crystal specimen of the compound is irradiated with monochromatic X-ray radiation from different directions, some of which is diffracted in specific patterns and recorded by an X-ray detector. The structural information of the specimen is determined from the geometry and relative intensities of these diffraction patterns.

A typical laboratory system 100 for performing single-crystal X-ray diffraction experiments normally consists of five components as shown in FIG. 1. The components include an X-ray source 102 that produces a primary X-ray beam 104 with the required radiation energy, focal spot size and intensity. X-ray optics 106 are provided to condition the primary X-ray beam 104 to a conditioned, or incident, beam 108 with the required wavelength, beam focus size, beam profile and divergence. A goniometer 110 is used to establish and manipulate geometric relationships between the incident X-ray beam 108, the crystal sample 112 and the X-ray sensor 114. The incident X-ray beam 108 strikes the crystal sample 112 and produces scattered X-rays 116 which are recorded in the sensor 114. A sample alignment and monitor assembly comprises a sample illuminator 118 that illuminates the sample 112 and a sample monitor 120, typically a video camera, which generates a video image of the sample to assist users in positioning the sample in the instrument center and monitoring the sample state and position.

The goniometer 110 allows the crystal sample 112 to be rotated around several axes. Precise crystallography requires that the sample crystal 112 be aligned to the center of the goniometer 110 and maintained in that center when rotated around the goniometer rotational axes during data collection. During exposure, the sample (a single crystal of the compound of interest) is rotated in the X-ray beam 108 through a precise angular range with a precise angular velocity. The purpose of this rotation is to predictably bring Bragg reflections into constructive interference with the incident beam 108. During this time, called the charge integration time, the pixels of the sensor receive and integrate the X-ray signals. A plurality of rotations may be required for a complete crystal structure determination. The combination of these rotations and their angular velocities is called the data collection strategy.

FIG. 2 is a process flow diagram showing the steps of a conventional crystal structure determination using a single-crystal X-ray diffractometer. Diffraction frames 202 collected from the sample are used in a harvesting step 204 to extract the vector directions and intensities of the diffracted X-ray energy, generally referred to as "reflections" 206. Typically, frames 202 are obtained using a dedicated scan optimised for matrix determination (matrix strategy). In an indexing step 208, the reflections are used to determine the lattice formed in reciprocal space. This step involves finding the well-known "Miller indices" that allow a determination of the structure of the crystal sample. The resulting orientation matrix 210 is then used in an integration step 212, in which the shape of the reflections and their relative intensities are used to establish a model profile. This information is also used in the system shown in the figure for a data strategy determination step 214 to produce a data strategy 216 for subsequent scans (e.g., relative movement of the sample and X-ray beam/detector, exposure time, etc.), based on the matrix data and the known instrument capabilities. Using this data strategy 216, a full data acquisition 218 is conducted, in which a full scan of the sample is performed and many more frames of diffraction data 220 are recorded. This more detailed scan data is used together with the initial matrix data 210 as part of the integration step 212.

An intensity error estimate is established using raw data 222 produced during the integration step, and is used in scaling step 224 to correct the data for errors and uncertainties. From this the "HKL" data 226 of the reciprocal lattice is produced and is used in a space group determination 228 which, in turn, is used together with the HKL data in a structure solution determination 230. This produces a structure solution 232 that includes both a molecular structure and space group. In a structure refinement step 234, the solution is refined to account for possible misidentification of atoms or motion of atoms, and for the incorporation of hydrogen atoms. The resulting structure data 236 is then used by report generator 238 in the generation of a final structure report 240 in a format that can be imported into a user-friendly display vehicle, such as a web browser.

SUMMARY OF THE INVENTION

In a conventional diffractometry system like that discussed above, the steps of the process are performed in a predominantly sequential manner. That is, an earlier step in the process is completed prior to the start of a later process. In contrast, the present invention uses an integrated process that includes a number of independent software modules that perform different parts of the structural determination process in parallel, using outputs from certain modules as inputs to others. As new inputs become available, the operation of a given module, or automaton, continues, and the outputs that it generates become further refined. In this manner, there is no need for one module to wait for another to begin working, and the overall processing time of the system is reduced.

In accordance with the present invention, a diffraction system for determining a crystalline structure of a sample under test is provided. The sample is illuminated by a beam of radiation and radiation diffracted from the sample is detected by a detector that generates a corresponding output. An exemplary embodiment described herein is based on single-crystal X-ray diffraction, but those skilled in the art will understand that the invention is also applicable to other types of diffraction systems, whether the diffracted radiation is photonic or particulate. As discussed below, the invention makes use of a group of software modules organized, respectively, in different segments.

A data collection software segment receives the detector output and generates a set of diffraction frames indicative of a corresponding diffraction pattern. A data reduction software segment receives the diffraction frames and determines an HKL dataset indicative of a set of Miller indices of a reciprocal space lattice of the crystalline structure. A structure determination software segment receives the HKL dataset and determines a crystal structure therefrom, outputting it as a crystal structure dataset.

In an exemplary embodiment, the data reduction software segment comprises a harvesting software module that receives the diffraction frames and extracts a set of vector directions and intensities of the diffracted radiation therefrom, generating a corresponding reflection dataset. The data reduction segment also includes an indexing software module that receives the reflection dataset and determines characteristic indices of the crystalline structure therefrom, the indexing module generating an orientation matrix dataset indicative of the characteristic indices. The data reduction software segment may also include an integration software module that receives the diffraction frames and the matrix dataset and determines a model crystal profile therefrom that is represented as a raw data dataset. The data reduction software segment may further use a scaling software module that receives the raw data dataset and corrects for errors and uncertainties therein, the scaling module generating the HKL dataset. In another variation, the data collection software segment may include a data strategy software module that receives the HKL dataset from the data reduction software segment and determines optimized data collection parameters that are used in collecting the diffraction frames.

The modules of the exemplary embodiment each represent an independent processing component that receives at least one input parameter from another module of the system, and generates at least one output parameter that is made available to at least one other module of the system. In addition, at least some of the modules operate simultaneously and generate successive versions of their respective output parameters based on successive versions of their respective input parameters. In this way, the different processing modules of the system are continuously revising the quality of the outputs being generated, and are doing so while operating in parallel so as to minimize processing time. The exemplary embodiments described herein include different processing modules that perform specific operations, but those skilled in the art will understand that there are numerous ways of dividing up the tasks of the system, and that the processing functionality may make use of processing modules having different specific tasks, or modules that group together or separate out certain tasks in a manner different than that described herein.

In the exemplary embodiment, the system includes a global parameter list that is accessible to, and updatable by, the processing modules. In this embodiment, each processing module has access to, and updates, only a subset of the parameters of the global parameter list. A processing module may execute an operation specific to that module automatically upon receiving a modified version of an input parameter of that module. In one variation, at least one of the processing modules assigns a trustworthiness value to an output parameter that it generates that is used to rank its reliability in comparison to other versions of the same output parameter generated by any processing module. A processing module having two versions of the same input parameter available may select only the version having the higher trustworthiness value. In another variation, certain parameters that have an interrelationship may be tied together such that they are received as an input pair, or made available as an output pair, by a processing module. In yet another variation, a processing module may revoke an earlier version of an output parameter if it subsequently generates a newer version of that output parameter, and may broadcast the revocation to other processing modules that receive that parameter as an input. The system may also make use of parameters that are identified as optional, such that a processing module will check for the presence of an optional input parameter, but will continue performing an operation using previous inputs if a new optional parameter is received.

DETAILED DESCRIPTION

Figure 1:
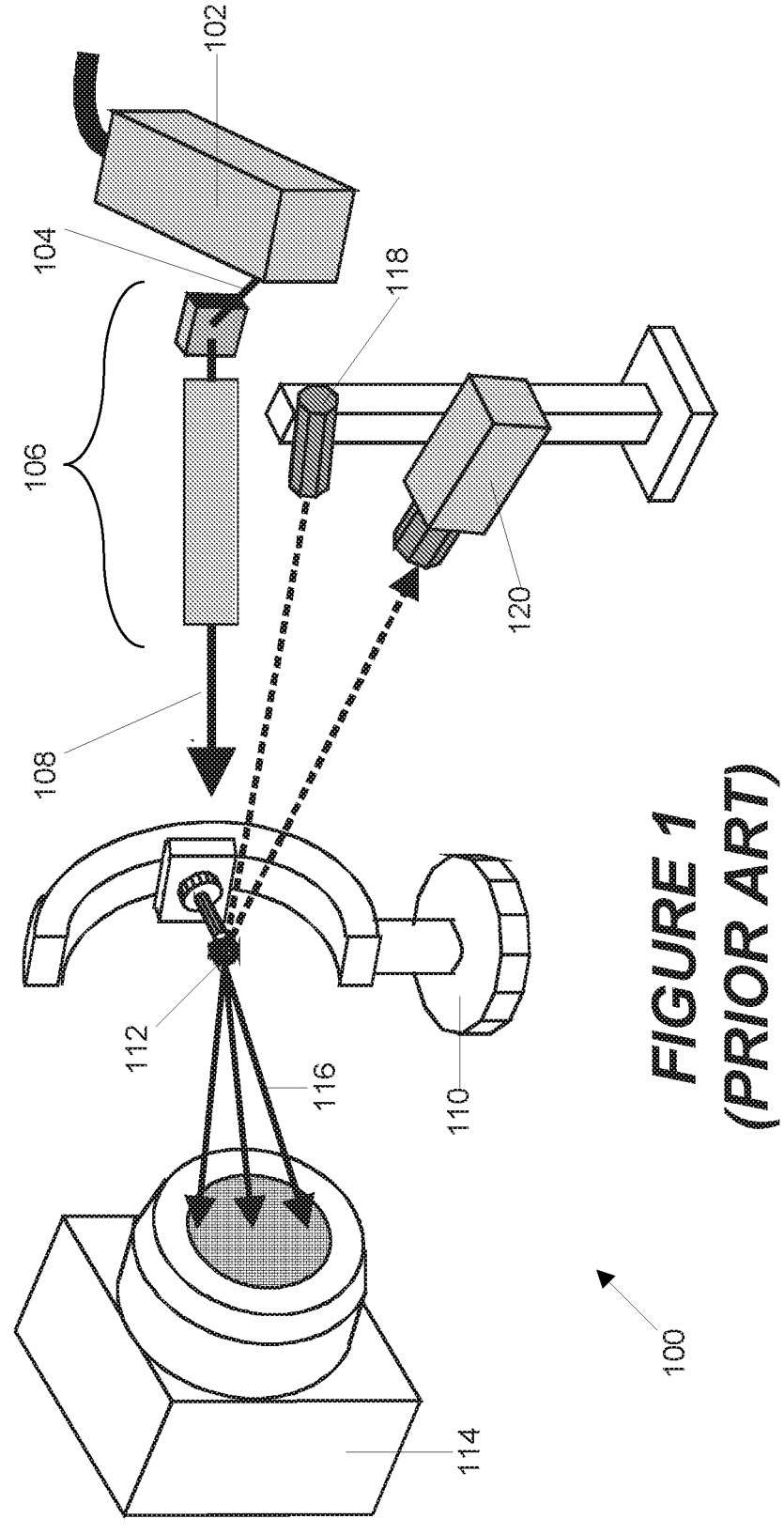
FIG. 1 is a schematic view of an X-ray diffraction system according to the prior art.
Figure 2:
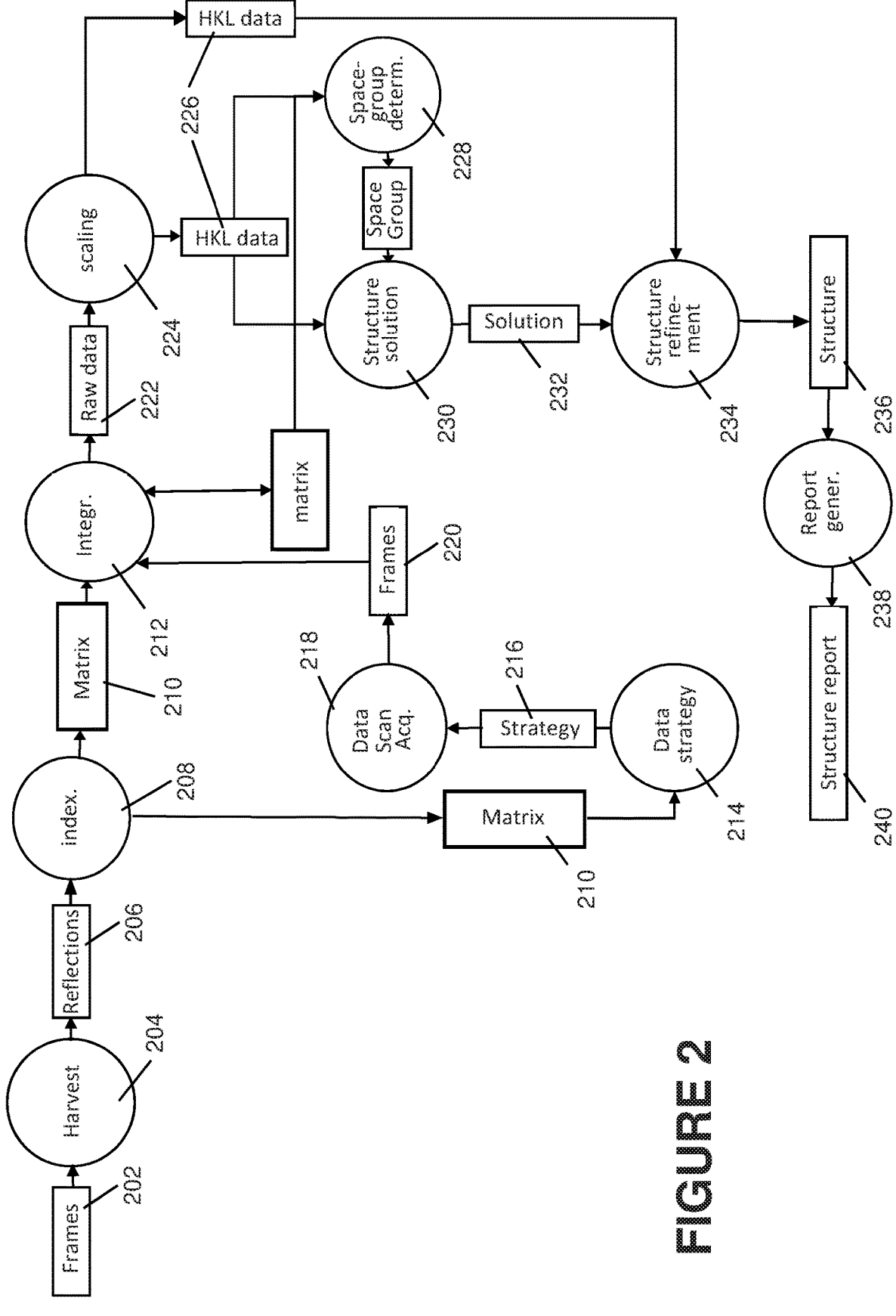
FIG. 2 is a schematic view of possible processing components for a system like that of FIG. 1.
Figure 3:
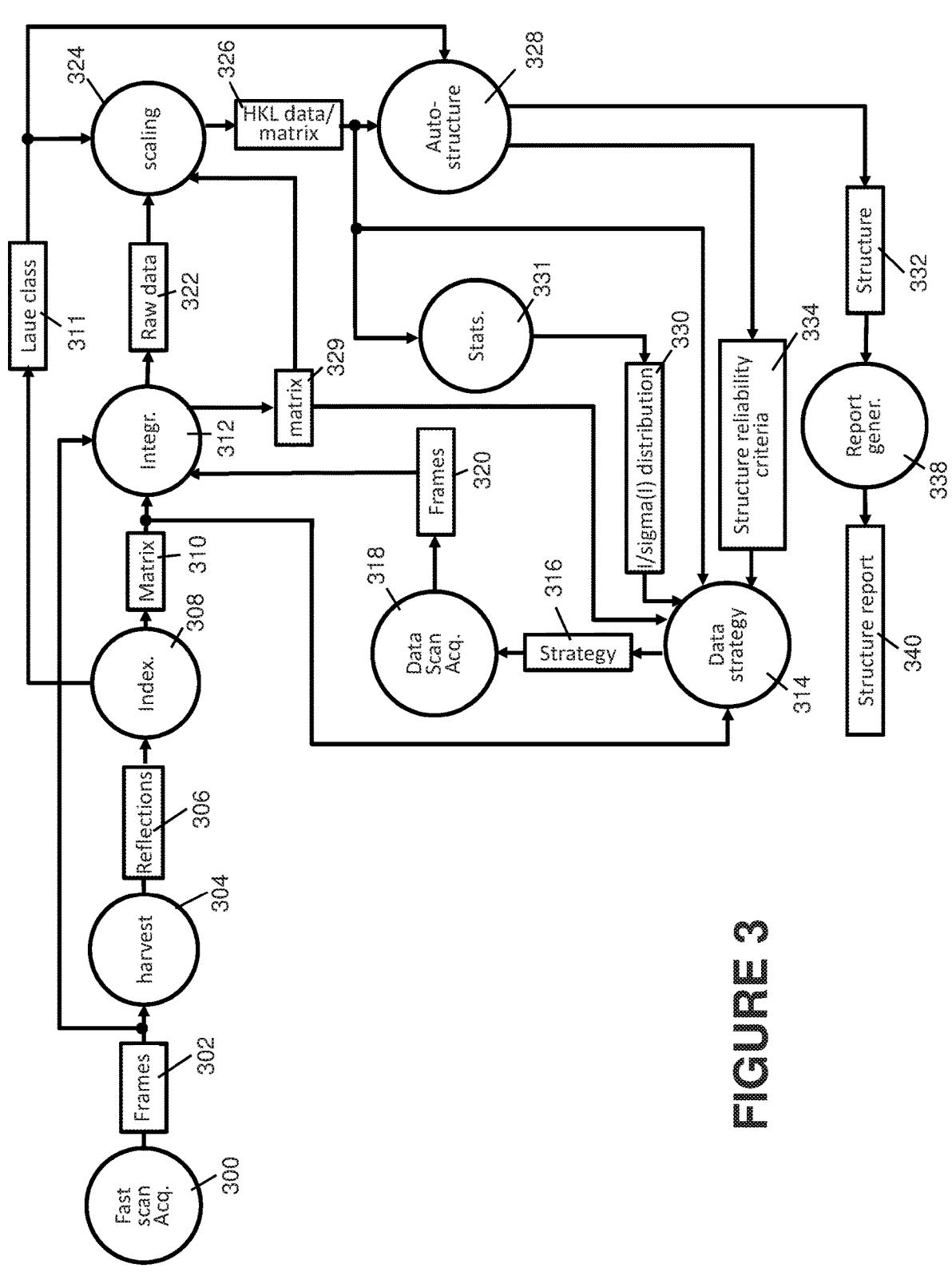
FIG. 3 is a schematic view of the processing components of an exemplary embodiment of a diffraction system according to the invention.

FIG. 3 is a process flow diagram showing the steps of a crystal structure determination using diffractometer according to an exemplary embodiment of the present invention. In this embodiment, the diffractometer is based on X-ray diffraction, but those skilled in the art will recognize that the system applies equally to other types of diffractometry, whether using photonic radiation or particulate radiation. As discussed below, whereas prior art methods rely on sequential operations in proceeding from an initial diffraction data collection to a final structure report, the present invention performs many operations in parallel by a set of interconnected processing modules, or "automatons," each performing separate operations. This allows for both faster data processing and process refinement for automatons that receive feedback from downstream operations. Those skilled in the art will understand that the particular configuration shown in FIG. 3 is but one example of a diffractometry process according to the invention, and that different arrangements of automatons may also be used without departing from the principles of the invention.

In FIG. 3, the automatons are represented by circles and the type of information transferred between automatons is represented by rectangles. The arrows indicate the flow of information between the various elements. The labels for the types of information in FIG. 3 are for context only and detailed descriptions of what they entail follow below. A fast scan acquisition 300 is an initial automaton that is part of a data collection segment of the system and that instructs the single-crystal diffraction system to collect an initial cursory scan used to determine data collection parameters to be used during the main data collection phase, which involves an atomic-resolution measurement that is conducted to determine the three-dimensional structure of the crystalline compound, and that may be modified and optimized by one or more automatons running in parallel with other automatons of the system. The initial fast scan provides enough information for determining the appropriate exposure time and the type of data needed for the complete measurement, depending on the type of single-crystal diffraction system used and the symmetry of the crystal. During this scan, the crystalline sample is irradiated by a conditioned X-ray beam, and the Bragg reflections diffracted by the crystalline compound are captured by the X-ray detector. The expression "fast scan" refers to the angular speed at which the crystalline compound is moved and to the exposure time used for each frame. While the X-ray detector captures diffraction frames, the crystalline compound is moved about a rotational or scanning axis.

In the embodiment of FIG. 3, the diffraction frames 302 collected during the fast scan are directed to the data reduction segment of the system, which includes harvesting automaton 304, indexing automaton 308, integration automaton 312 and scaling automaton 324. The harvesting automaton, as in the prior art, extracts the vector directions and intensities of the diffracted X-ray energy, which are output as "reflections" 306. The diffraction frames are also directed to integration automaton 312, which is discussed in more detail below. The data collection parameters established by the fast scan allow the integration automaton to begin building a model profile while the same data is still being refined in the harvesting and indexing processes, allowing the automatons to run in parallel.

The indexing automaton 308 determines the Miller indices of the Bragg reflections and outputs orientation matrix 310. Also output is the Laue class 311, which is the centrosymmetric point group that describes the three-dimensional diffraction symmetry of the crystal. The Laue class 311 indicates which reflections are related by symmetry and are therefore expected to have the same intensities. The Laue class is output to scaling automaton 324, which uses this information to correct certain systematic errors in the data, which would otherwise cause the observed intensities to be different (e.g., due to absorption by the crystal sample or by movements of the crystal due to imperfect centering). The Laue class information is also used by auto-structure automaton 328 to narrow the search for the correct space group by eliminating from the possible choices those space groups that would not be compatible with the Laue class.

The integration automaton 312 uses the orientation matrix 310 to establish a model profile and output the integrated reflections as unscaled raw data 322 which, in turn, is directed to scaling automaton 324. As mentioned above, the integration automaton 312 is already running in parallel with the others, such that construction of the model profile has already begun based on the initial diffraction frame data transferred from the fast scan acquisition automaton 300. As discussed further below, the integration automaton 312 also receives additional frames of diffraction data 320 output by the data scan acquisition automaton 318, which is part of the data collection segment of the system. These additional frames are collected by the single-crystal diffraction system in accordance with a data collection strategy 316 that is optimized for the crystal sample by data strategy automaton 314. The data strategy automaton 314 runs in parallel with other system automatons and modifies the data collection as outputs from the other automatons continue to improve the quality of the collected data.

The scaling automaton 324 corrects for errors and uncertainties in the unscaled raw data 322. In particular, it identifies reflections that are related by symmetry, as indicated by the Laue class, and which should therefore have the same intensity. From observed differences in the intensities, the scaling automaton 324 derives models describing parameters such as the X-ray absorption by the crystal, the eccentricity of the crystal in the beam and changes in the primary beam intensity of the X-ray source. In addition to the unscaled raw data 322 and the Laue class 311, it receives orientation matrix 329 from the integration automaton. This matrix has the same symmetry as matrix 310, but the numerical values of unit cell axis lengths and angles are more accurate, as the integration automaton performs a global fit based on more accurate positions of the Bragg reflections, and uses a more detailed model of the hardware.

The scaling automaton 324 outputs data pair 326, which includes HKL data of the Bragg reflections, representing the Miller indices of the reciprocal space lattice and the intensities with uncertainties, and the orientation matrix that may be different from that input to the scaling automaton 324. In particular, the matrix data in the data pair 326 may have a lower symmetry than matrix data 329, because the scaling automaton 324 takes into account the intensity of the Bragg reflections in addition to their position, which may show that the true symmetry of the crystal is lower than indicated by the input symmetry if the intensities of the Bragg reflections are not compatible with the higher symmetry. This data pair 326 is output to the auto-structure automaton 328 and used in the determination of a structure solution 332, as discussed below.

Auto-structure automaton 328 is part of a structure determination software segment of the system, and determines a structure solution using a known methodology, such as a structure solution in space group P1 from a Patterson superposition minimum function followed by a dual-space phase determination. In such a case, the automaton tries to determine the atoms in the whole unit cell as a first "P1 phase," and then identifies the symmetry of the solution it has found. Finally, all space groups are tested in the Laue class specified by Laue class input 311 to determine which are consistent with the P1 phases. Unlike the prior art, the structure determination is done by the auto-structure automaton 328 in parallel with the operations of most of the other automatons, such that an initial structure determination is refined as updated HKL data 326 is received from the scaling automaton 324. The auto-structure automaton 328 also does a refinement process, using the crude electron density obtained from the structure solution to find electron density peaks and account for them by choosing atoms of the appropriate chemical element. The position and thermal vibration of these atoms is then fitted to the measured HKL data 326 using a known technique.

The auto-structure automaton also performs a structure refinement step, which corrects for any possible misidentification of atoms and/or for motion of atoms, and adds hydrogen atoms as appropriate. As in the prior art, the structure 332 found by the auto-structure automaton 328 is output to a report generator automaton 338, which generates a final structure report. However, this reporting process is not performed until a final structure determination is made, since the operation of the automatons in parallel results in a continual improvement in the data quality over a period of time. The decision on when a final determination of structure has been reached may be based on predetermined criteria and, in the present embodiment, is based on whether the so-called $R_1$ value is low enough (less than 3%). This value is a measure of the difference between the measured HKL data 326 and the ones predicted from the atomic model. Another possible criterion is whether the uncertainty of some elements of the structure geometry, such as atom bond lengths and bond angles, are below a specified threshold. The Flack parameter and its uncertainty, which quantifies the confidence with which the chirality of the molecule has been determined, is yet another criterion. Those skilled in the art will understand that these are but a few examples of criteria for deciding when the final determination of the structure has been reached, and that different criteria may also be used without departing from the principles of the invention.

Also output by the auto-structure automaton 328 are structure reliability criteria 334 that are input to data strategy automaton 314, which is part of the data collection segment of the system. These criteria provide indications to the data strategy automaton 314 as to which HKL data 326 should be focused on in the planning of the next data scan. Automaton 314 also receives I/sigma(I) distribution information 330, which is the ratio between the intensity and the estimated uncertainty of all HKL data 326, making it a robust measure of whether collected data are accurate enough. This can be used to determine which Bragg reflections to collect again, so as to reduce the estimated uncertainty of the intensities of HKL data 326. The I/sigma(I) distribution 330 is calculated by a statistics automaton 331, which receives as input the matrix and HKL data 326 from the scaling automaton. In addition, the data strategy automaton 314 receives matrix inputs from the indexing automaton 308 and the integration automaton 312. The data strategy automaton uses the input data to calculate a sequence of crystal rotations and detector motion to optimize the collection of frames so as to cover the entire reciprocal space. This optimal data collection strategy 316 is output to the data scan acquisition automaton 318, which generates improved diffraction frames 320 that are based on the data strategy and that are input to the integration automaton 312. Also, the fast scan acquisition automaton 300 and the data scan acquisition automaton 318 output the cumulative data collection strategy that they used and this information is another input to data strategy automaton 314 (not shown in FIG. 3). The data strategy automaton uses this information to avoid issuing the same or closely related data scans again. Data strategy automaton 314 performs its calculations in parallel with the ongoing data collection by fast scan acquisition automaton 300 and data scan acquisition automaton 318, as well as the ongoing data processing by the harvesting automaton 304 and integration automaton 312.

Automatons

The automatons of the present invention are objects in an object-oriented programming language that are each responsible for performing a different task, e.g., one of the steps of the crystallographic workflow. To perform these tasks, each automaton receives one or more inputs, each of which is labeled with a unique identifier. Each automaton also produces one or more outputs, which are also labeled with unique identifiers. The automatons cooperate with one another by having certain automaton outputs input to other automatons. In operation, the automatons proceed according to the following specifications:

1. Automatons may run simultaneously.
2. An automaton starts running when all of its necessary inputs are provided to its input queue, and whenever an input value is updated with a changed input value.

3. An automaton may assign a trustworthiness value to an output it produces, which may be used to rank its reliability in comparison to other versions of that output produced by the same or a different automaton.
4. An automaton having two versions of the same input available may select only the version having the higher trustworthiness value.
5. An automaton that receives two or more inputs from the same source may combine these inputs, e.g. in a tuple, to preserve their context and avoid contamination if another source also provides one of the same inputs.
6. An automaton may revoke an output it produces if it subsequently produces a new version of that output that supersedes an earlier one, and it may broadcast the revocation to other automatons that use that output.
7. Some inputs are optional, and an automaton may check for the presence of an optional input, but will not pause in its execution if all non-optional inputs are available.

A general structure and mode of operation of the automatons is described in more detail below.

Figure 4:
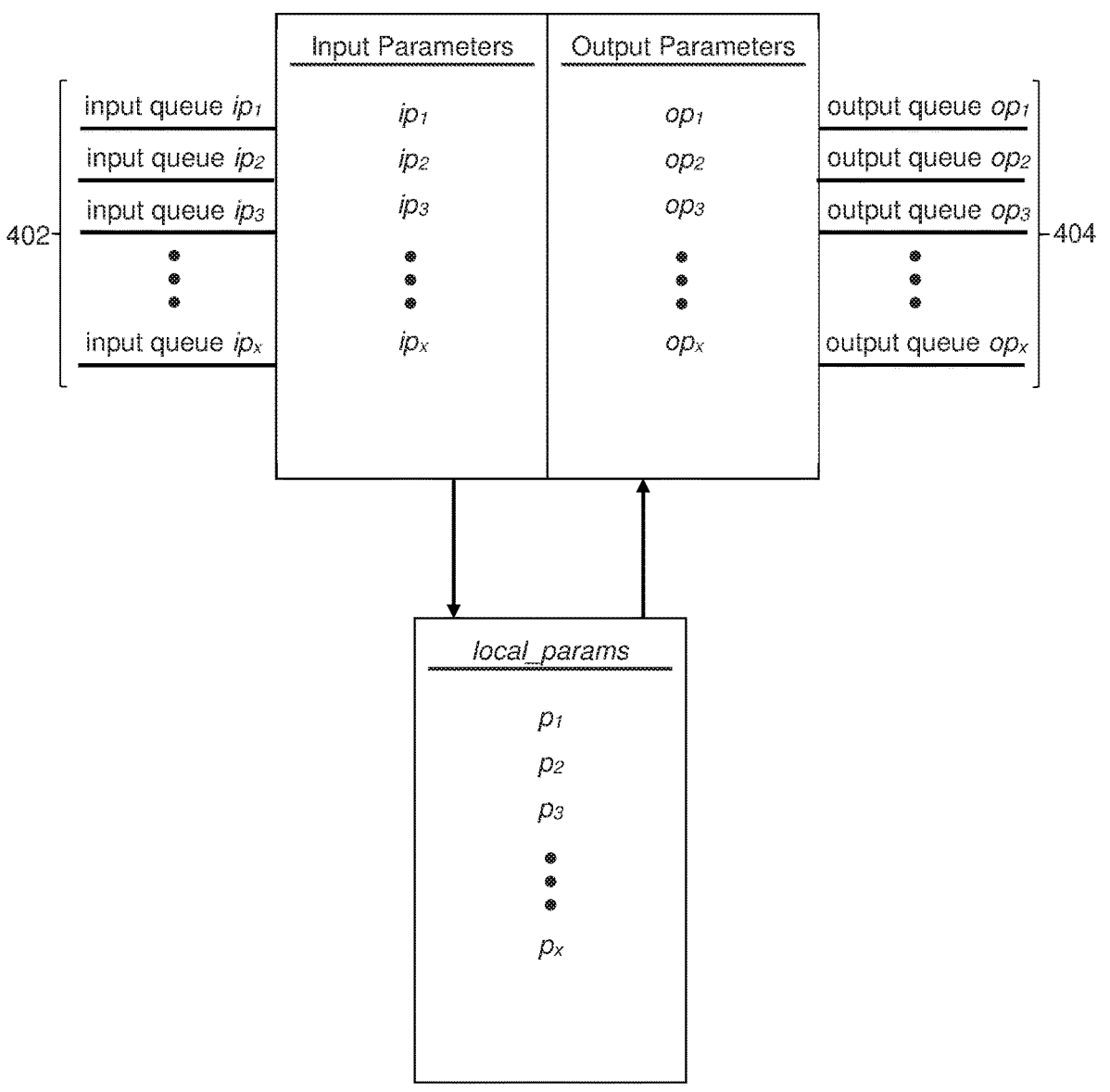
FIG. 4 is a schematic depiction of the processing of input and output parameters by an automaton used with a system according to the present invention.

FIG. 4 shows a schematic depiction of the general configuration of an automaton, indicating how necessary input parameters are received along a series of input queues 402, and generated output parameters are output along a series of output queues 404. As shown, each concurrent automaton maintains two lists: "input parameters," which lists the input parameters that the automaton needs prior to performing its action; and "output parameters," which lists the parameters that the automaton may have changed after it performs its action. Each automaton also features a queue input_queue into which other automatons may push pairs (name, value) for the parameter they output.

As shown in FIG. 4, each automaton also maintains a local copy of the list "params", which contains parameter values that are shared by all automatons, whether they operate concurrently or not. The local version is copied from the "params" list, which is a universal parameter list that is copied by each automaton that then maintains a local copy labeled "local_params". The parameters listed on the "local_params" list of each automaton can represent either input or output parameters depending on the circumstances, and are therefore listed on the "local_params" list without any specific identification as either an input or an output parameter. An automaton could potentially have as an input a parameter "$p_x$" that is modified by the automaton and then broadcast to the rest of the system (including to itself) using the same label "$p_x$". That is, when an automaton producing $p_x$ has performed its task, it will put that parameter and its value on the input queue of each automaton which advertises itself as taking $p_x$ as input. Each automaton that is not performing a task is idle waiting for a new value to arrive at its input queue. Thus, when a parameter such as $p_x$ arrives, it immediately starts working.

Figure 5:
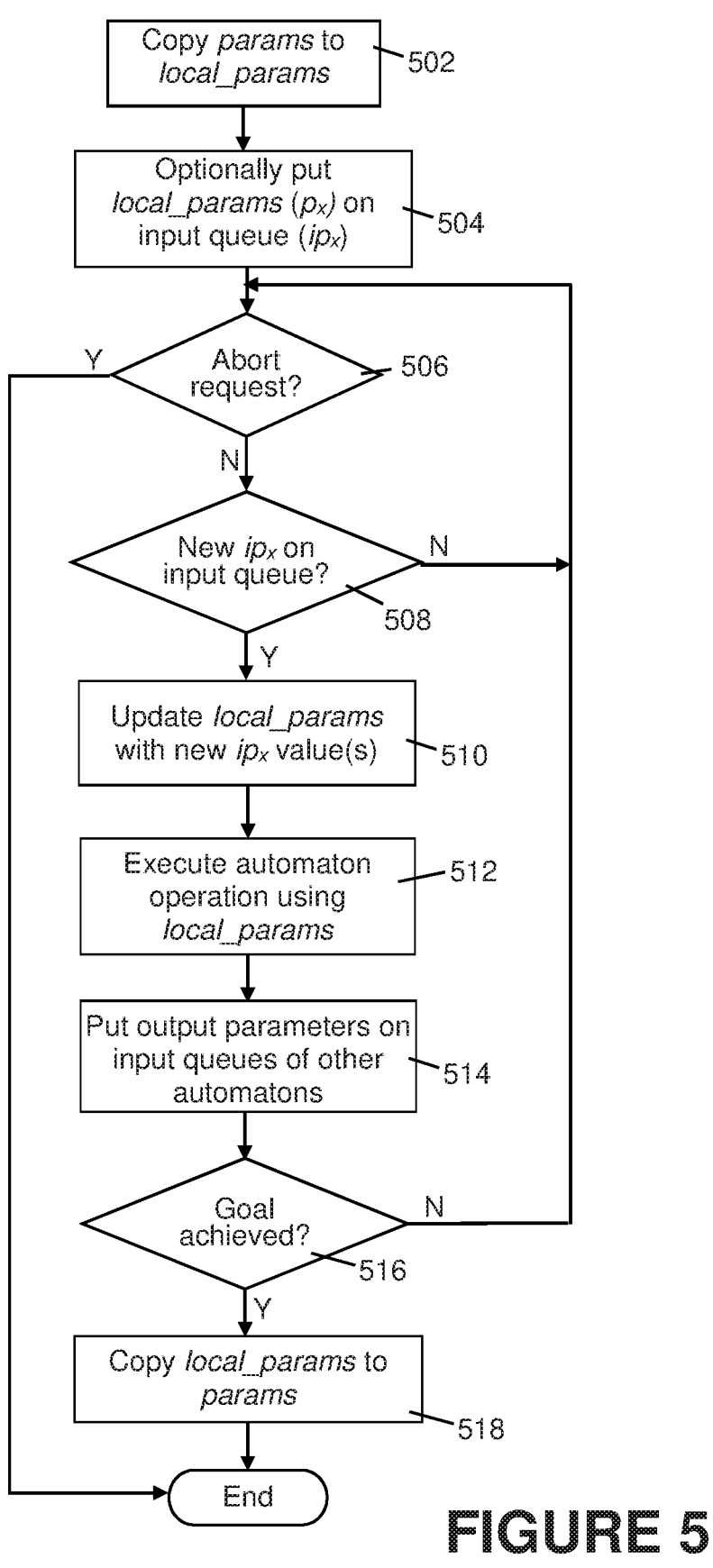
FIG. 5 is a flow diagram showing the processing steps of a generic automaton according to the present invention.

The basic logic of each concurrent automaton is shown in the flow diagram of FIG. 5. In a first step, a local copy ("local_params") of the global "params" list is made (step 502). The values $p_x$ of the list "local_params" are then optionally put on the input queue of the automaton (step 504). That is, $ip_1$, $ip_2$, . . . , $ip_n$, are updated using the corresponding values $p_1$, $p_2$, . . . , $p_n$, and this updating step continues until each input parameter has been assigned a new value. As discussed further below, this provides a method for starting automaton operation when an input value that an automaton is waiting for is not being generated by another automaton. By loading a value for this parameter in the input queue for the automaton, an unintended idling of the automaton is avoided. As shown in step 506, the automaton can also be given an abort request which, when received, will cause the process to halt until it is restarted. Although this step is shown at a particular location in the flow diagram of FIG. 5, and a check is always done at least at that location, those skilled in the art will understand that such a request may be received at any time, and will be processed by the automaton when received.

The automaton will respond to new parameter values $ip_x$ on the input queue. At the start of the process, it waits for values to be assigned all of the parameters, but once the process has started, any changed parameter will satisfy the query in step 508. If no new parameter values have been received, the process waits at this stage. When a new value is received, the automaton updates local_params with the new $ip_x$ value or values (step 510). The automaton operation is then executed in step 512, and new output parameters resulting from the operation are put on the input queues of other automatons, as appropriate (step 514). All parameters advertised by the automaton as output parameters are put on the input queues of the automatons that advertise as having one or more of those parameters as an input. This is done regardless of the new parameter values as it is implicitly assumed that they have all changed as a result of the automaton executing its task. The automaton then checks to see whether its final goal has been achieved (step 516) and, if so, it copies local_params to the global params list (step 518) and terminates the process. If not, the routine returns to step 506 and waits for any new inputs on the input queue.

The basis for determining that the goal has been achieved will be different for different automatons, as will be understood by those skilled in the art. For example, an automaton in charge of data collection will reach its goal when all the frames planned ahead have been collected. In addition, while the flow diagram in FIG. 5 shows the automaton waiting at step 508 when it has not determined that its goal has been achieved, and this is the normal mode of operation, the special circumstance when no automaton works anymore (either because it has finished, or because it is idle waiting for new inputs) is handled in a special manner. A monitor periodically checks whether this situation has occurred, and if it has been in this state for a predetermined amount of time, the monitor terminates all idle automatons.

As discussed above, once an automaton process has begun, the automaton will not wait for all input parameters to change. Rather, once any parameter receives a new value, the process will recommence. In this way, automatons can run in parallel, constantly updating their results as new information becomes available. The list local_params represents the current state of the parameters as known to the local automaton, which will update the list from its output parameters queue as appropriate. At the end of its processing, the local_params list of each automaton is used to update the global list params, as shown in step 518. Thus, after all of the automatons have reached their respective goals, this global list will represent the final parameter set for the system operation. The final value of a parameter will therefore be that produced by the last automaton to treat that parameter. Unlike prior art systems, however, the different processing segments of the system do not operate sequentially, with one waiting for a previous one to finish. Rather, all of the automatons will operate in parallel to allow for a much faster operation.

Different embodiments of the invention may use some variations on the logical flow shown in FIG. 5. For example, as mentioned above, it may be desirable to "kick start" an automaton by feeding the input queue for an input parameter $p_x$ with a corresponding value from the shared dictionary "params." In such a case, an automaton "A" would list the names of such parameters in a list "A.pre_fed_params." This practice prevents the unintended idling of an automaton when the list local_params is updated by a version of "params" that has updated parameters, but none that are input to the automaton in question. In such a case, the automaton in question would fail to start its intended operation because there were no new parameters received on its input queues, even though the rest of the system would be operating.

In another variation, the system treats certain parameters collectively because there is a logical tie between them. That is, there are certain instances in which an automaton will only operate on one input parameter if a second input parameter to which the first is tied is generated by the same automaton as the first. Thus, if an automaton "A" identifies parameters $ip_1$ and $ip_2$ in its list "input_parameters" as being "tied," that automaton will require the values of $ip_1$ and $ip_2$ to have been produced together by the same automaton (e.g., automaton "B"). Such a tie is denoted both in the list output parameters of any automaton (e.g., automaton "B") producing such a tied pair, as well as in the list "input_parameters" of the first automaton (e.g., automaton "A"). This may be denoted, for example, as follows: A.input_parameters=[($p_1$, $p_2$), $p_3$, $p_4$, . . . ] and B.output_parameters=[($p_1$,$p_2$), $p_5$, . . . ].

Some examples of inputs and outputs used with the automatons in the overview of FIG. 3 are shown in FIGS. 6A-6E. The "harvesting" automaton shown in FIG. 6A has a single input parameter, images, which is a list of file names of the frames being collected, and which corresponds to the diffraction frames input 302 shown in FIG. 3. The harvesting automaton also has three output parameters, mosaicity, spots and images, which make up the reflections output 306 shown in FIG. 3, and that are logically tied together as a triplet. The parameter mosaicity is an angle describing the spread of the crystal plane orientations compared to a perfect crystal with 0° mosaicity, and it represents a measure of how well the crystal planes of the sample are aligned. The parameter spots contains data on the harvested Bragg reflections on the diffraction frames produced, and can be a list of detector pixel positions of the reflections on the diffraction frames. The parameter "images" is a list of file names of the frames from which the reflections were harvested.

Figure 6A:
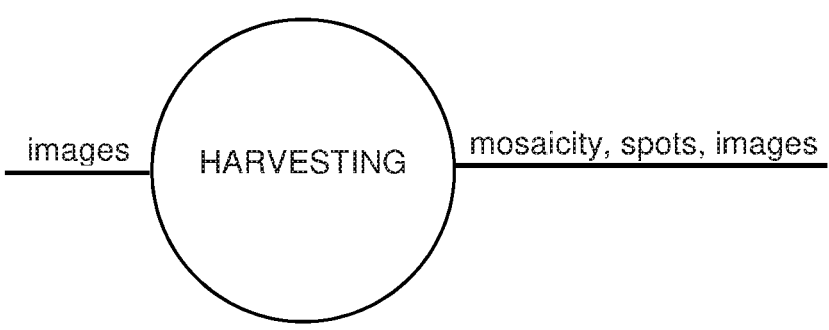
FIG. 6A is a schematic depiction of the inputs and outputs of a "harvesting" automaton according to the present invention.
Figure 6B:
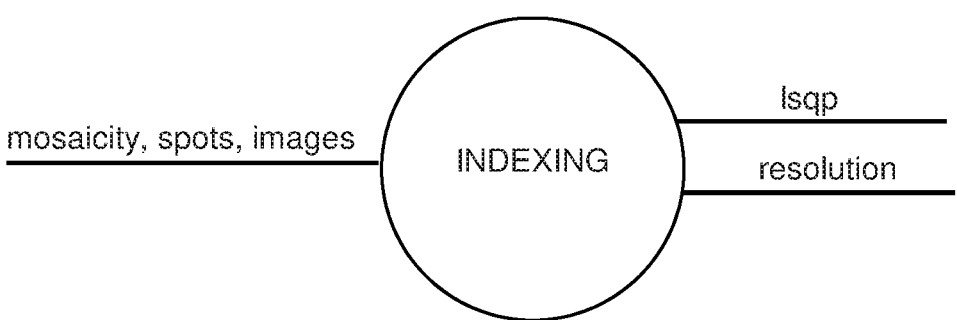
FIG. 6B is a schematic depiction of the inputs and outputs of an "indexing" automaton according to the present invention.

The "indexing" automaton shown in FIG. 6B receives the parameters "mosaicity", "spots" and "images" from the harvesting automaton and produces the outputs lsqp and resolution. The parameter lsqp includes information regarding the unit cell of the measured crystal sample, such as axes, angles (and their relative uncertainties) and symmetry, and corresponds to both the matrix output 310 and the Laue class output 311 of FIG. 3. The parameter resolution is a value that indicates the resolution of the diffraction measurement in terms of the smallest level of detail that can be distinguished, and is also passed with the matrix data 310 shown in FIG. 3.

Figure 6C:
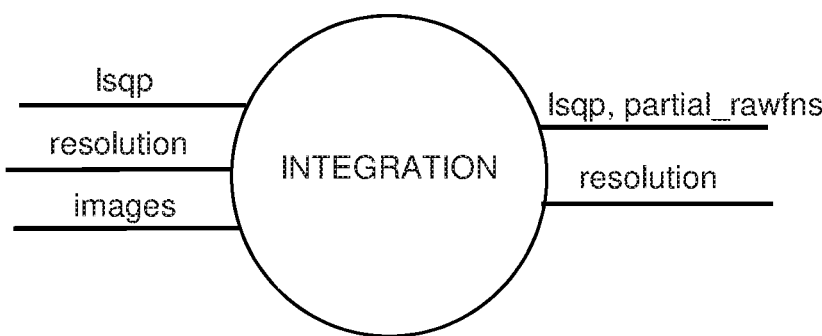
FIG. 6C is a schematic depiction of the inputs and outputs of an "integration" automaton according to the present invention.

The "integration" automaton is shown in FIG. 6C, and receives the inputs lsqp and resolution, both of which are output by the indexing automaton. It also receives the input images, which corresponds to both the frames input 302 from the "fast scan acquisition" automaton 300 as well as the frames input 320 from the data scan acquisition automaton 318 in FIG. 3. In this case, both sets of frames data are accepted as the same input, which is processed as more diffraction frames are provided by the data scan acquisition automaton. As mentioned above, the integration automaton is responsible for taking the orientation matrix data of the indexing automaton and creating a "model profile." This is determined by first constructing a three-dimensional observed profile for each reflection, which is indicative of pixel intensity relative to scan angle for detector pixels falling within the predicted reflection position on the detector derived from the orientation matrix. A learned "model" profile is also constructed as an average of the normalized profile data from a plurality of reflection profiles.

The model profile is not output to other automatons, but is used in the determination of the reflection intensities, which are output as part of a set of ".raw" files contained within the parameter partial_rawfns, which is tied to the parameter lsqp in the tied parameter pair (lsqp, partial-_rawfns). The resolution parameter is described above, as is the lsqp parameter, both of which are output as part of the matrix data 329. The parameter partial_rawfns contains a list of the ".raw" files that have been processed so far, as well as the .raw file for the scan being currently processed, and corresponds to the raw data output 322 of FIG. 3. The .raw files contain the list of diffraction peaks integrated by the automaton, and there is one for each scan performed. However, as the automatons of the invention run in parallel, the integration automaton does not wait for the end of a scan to write a .raw file. Rather, it continuously writes the Bragg reflections that have been integrated so far with a given periodicity (e.g., every 100 reflections). The parameter partial_rawfns is paired with the parameter lsqp because the unit cell knowledge is necessary to process the .raw files.

Figure 6D:
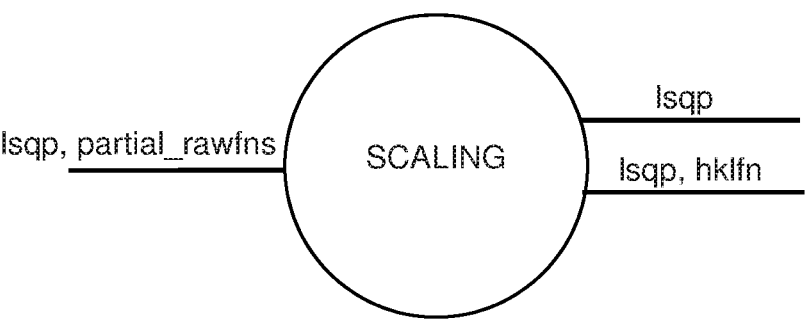
FIG. 6D is a schematic depiction of the inputs and outputs of a "scaling" automaton according to the present invention.

The "scaling" automaton is shown in FIG. 6D, and receives the tied parameter pair (lsqp, partial_rawfns), the lsqp parameter including the Laue class data 311 shown in FIG. 3, while the partial_rawfns parameter is received in the raw data 322 from the integration automaton. As described above, the scaling automaton makes corrections to compensate for errors and uncertainties in the data, and it outputs HKL data and orientation matrix 326 describing the Miller indices of the reciprocal space lattice. In particular, the scaling automaton outputs include the parameter lsqp and the tied parameter pair (lsqp, hklfn). The hklfn parameter is similar to a .raw file, but has a reduced amount of information. This parameter is in the form of a .hkl file and, although lsqp is also output as a separate parameter, it is also paired with hklfn to make sure that the unit cell information is available for further processing. The .hkl file contains the Miller indices, intensity and sigma of the intensity of each Bragg reflection, but does not contain other information that might be present in the .raw file, such as the goniometer angles, pixel positions on the detector where the reflection was observed and exposure time.

Figure 6E:
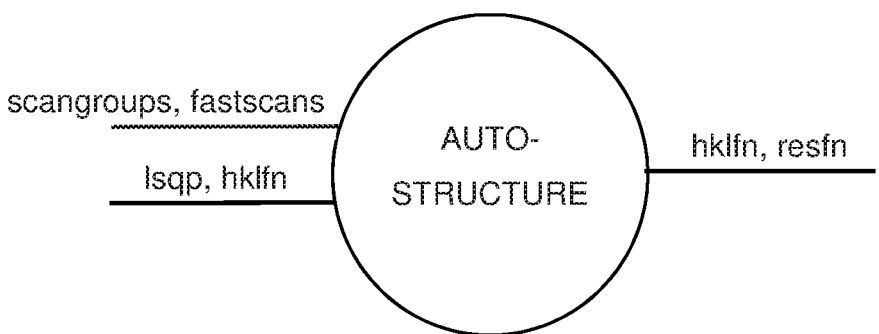
FIG. 6E is a schematic depiction of the inputs and outputs of an "auto-structure" automaton according to the present invention.

The HKL data and orientation matrix output by the scaling automaton is input to the "auto-structure" automaton 328, shown in FIG. 6E. This automaton receives the HKL data via tied input parameter pair (lsqp, hklfn), and also receives the parameter pair (scangroups, fastscans). The parameter fastscans is a list of Boolean operators, indicating which of the scans listed in the tied parameter scangroups is a "fast scan." The parameter "scangroups" is a list of frame file names, corresponding to the "frames" inputs/outputs shown in FIG. 3. The output shown in FIG. 6E is the tied parameter pair (hklfn, resfn), which is the result of the structure determination, and is output as structure reliability criteria 334 to the data strategy automaton 314. The parameter resfn contains the filename of a .res file, which features the atomic model of the structure. This is paired with hklfn, which contains the filename of the .hkl file that contains the data against which the model was refined, and that was used to determine the space group and solve the structure. This output .hkl file may be different from that received at the input, having been transformed by symmetries. In particular, the auto-structure automaton finds the space group and structure model. Space groups are defined according to the standards set up by the International Union of Crystallography. At times, the Miller indices output in the .hkl file do not comply with the standard setting of the determined space group and need to be reindexed. The reindexed .hkl file is part of the hklfn output.

Allowing the automatons to operate simultaneously, and regularly updating values that are improved over time, provides a system that is faster and more efficient than prior art systems. In general, rather than a step-by-step linear analysis, the automatons work together to progressively refine the structure data that is eventually used by the report generator. The general automaton functionality shown, for example, in FIGS. 4 and 5 ensures that the automatons will begin operation as soon as there is an opportunity to generate an improved set of output parameters due to the presence of a new input parameter.

As mentioned above, in one embodiment of the invention, an automaton may provide a trustworthiness value to an output it generates, such that other automatons using that output can determine whether a version of that output is the latest version. That is, if an automaton provides several versions of the same output, each superseding the last, another automaton that uses that output may select the most current version and ignore the others. This may also be accomplished by the setting of a flag in association with an output parameter that indicates whether it has been revoked. A similar test may be applied for parameters that are being independently generated by different automatons, such as unit cell values (e.g., as represented by the output lsqp). Because such values may result from indexing of reflections (e.g., by the indexing automaton), or by performing an analysis of the diffraction peak intensities (e.g., by the integration automaton), there may be a difference in the quality of these outputs due, for example, to one automaton having a lower workload than the other. As such, a ranking mechanism for the outputs may be used that allows them to be distinguished on the basis of which is more current. This may be particularly true for the example above, as the lsqp output is provided by the indexing automaton as an input to the integration automaton, which may still be working with an older version of this parameter while newer versions have already been output by the indexing automaton.

In another embodiment, an automaton may perform a check on a new version of an input value to determine the extent to which it deviates from a previous version. In such a check, a similarity test may be used and, if the newer version is too similar to the previous version, the automaton may ignore the newer version so as to conserve processing resources. A subsequent version would also be tested against the last used version of the input parameter.

Certain automatons are described above in conjunction with FIGS. 6A-6E, but those skilled in the art will understand that the other automatons shown in FIG. 3 also perform important functions. The data strategy automaton 314 and data scan acquisition automaton 318, for example, are discussed above together with the rest of the system. The report generation automaton 338 uses the final structure data 332 to prepare the structure report 340. However, unlike most of the other automatons of the system, it waits until all of the refinements steps of the other automatons are completed before starting the preparation of a structure report. In this way, the generated report is reflective of the final data values determined by the process.

While the invention has been shown and described herein with reference to an exemplary embodiment thereof, it will be recognized by those skilled in the art that various changes in form and detail may be made herein without departing from the spirit and scope of the invention as defined by the appended claims. In particular, although the foregoing description relates to a method of X-ray diffraction, the invention applies equally to systems that do structure determination using other types of diffraction. For example, such systems may use other types of photonic radiation such as infrared, visible or ultraviolet, or particulate radiation such as electrons, neutrons, atoms, or ions. As these systems all have similar requirements regarding data collection, data reduction and structure determination, the invention herein may apply to any of them.

The invention claimed is:

1. A diffraction system for determining a crystalline structure of a sample under test, the sample being illuminated by an incident beam of radiation and radiation diffracted from the sample being detected by a detector, the system comprising:

a data collection software segment that receives the detector output and generates a set of diffraction frames indicative of a corresponding diffraction pattern;

a data reduction software segment that receives the diffraction frames and determines an HKL dataset indicative of a set of Miller indices of a reciprocal space lattice of the crystalline structure; and a structure determination software segment that receives the HKL dataset and determines a crystal structure therefrom, the structure determination software segment outputting a crystal structure dataset;

wherein the data collection software segment, the data reduction software segment and the structure determination software segment comprise separate software modules, each of which is an independent processing component that uses at least one input parameter output by another module of the system and generates at least one output parameter that is made available to at least one other module of the system, and wherein at least some of said modules operate simultaneously and generate successive versions of said at least one output parameter based on successive versions of said at least one input parameter, at least one of the software modules making at least a first one of its output parameters available to a plurality of the other software modules in response to the generation of a successive version of the first output parameter.

2. The system according to claim 1 wherein the data reduction software segment comprises a harvesting software module that receives the diffraction frames and extracts a set of vector directions and intensities of the diffracted radiation therefrom and generates a corresponding reflection dataset.

3. The system according to claim 2 wherein the data reduction software segment further comprises an indexing software module that receives the reflection dataset and determines characteristic indices of the crystalline structure therefrom, the indexing module generating a matrix dataset indicative of said characteristic indices.

4. The system according to claim 3 wherein the data reduction software segment further comprises an integration software module that receives the diffraction frames and matrix dataset and determines a model crystal profile therefrom, the model profile being represented as a raw data dataset.

5. The system according to claim 4 wherein the data reduction software segment further comprises a scaling software module that receives the raw data dataset and corrects for errors and uncertainties therein, the scaling module generating said HKL dataset.

6. The system according to claim 1 wherein the data collection software segment comprises a data strategy software module that receives the HKL dataset and determines optimized data collection parameters that are used by the system in collecting the diffraction frames.

7. The system according to claim 1 further comprising a global parameter list in which is recorded said input parameters and output parameters of said software modules and that is accessible to, and updatable by, said software modules.

8. The system according to claim 7 wherein each software module has access to, and updates, only a subset of the parameters of the global parameter list.

9. The system according to claim 1 wherein a software module of the system executes an operation specific to that module automatically upon receiving a modified version of an input parameter of that module.

10. The system according to claim 1 wherein at least one of the software modules assigns a trustworthiness value to an output parameter that it generates that is used to rank its reliability in comparison to other versions of the same output parameter generated by any software module, and wherein a software module having two versions of the same input parameter available may select only the version having the higher trustworthiness value.

11. The system according to claim 1 wherein certain parameters that have an interrelationship are tied together such that they are received as an input pair, or made available as an output pair, by a software module.

12. The system according to claim 1 wherein a software module may revoke an earlier version of an output parameter if it subsequently generates a newer version of that output parameter, and may broadcast the revocation to other software modules that receive that parameter as an input.

13. The system according to claim 1 wherein certain of the parameters are identified as optional, and a software module will check for the presence of an optional input parameter, but will continue performing an operation using previous inputs if a new optional input parameter is received.

14. The system according to claim 1 wherein the diffraction system comprises an X-ray diffraction system, and wherein the incident beam of radiation comprises an X-ray beam.

15. A method of controlling a diffraction system for determining a crystalline structure of a sample under test, the sample being illuminated by an incident beam of radiation and radiation diffracted from the sample being detected by a detector, the method comprising:

receiving the detector output with a data collection software segment that generates a set of diffraction frames therefrom that is indicative of a corresponding diffraction pattern;

receiving the diffraction frames with a data reduction software segment that determines an HKL dataset therefrom that is indicative of a set of Miller indices of a reciprocal space lattice of the crystalline structure; and receiving the HKL data set with a structure determination software segment that determines a crystal structure therefrom, the structure determination software segment outputting a crystal structure dataset;

wherein the data collection software segment, the data reduction software segment and the structure determination software segment comprise separate software modules, each of which is an independent processing component that uses at least one input parameter output by another module of the system and generates at least one output parameter that is made available to at least one other module of the system, and wherein at least some of said modules operate simultaneously and generate successive versions of said at least one output parameter based on successive versions of said at least one input parameter, at least one of the software modules making at least a first one of its output parameters available to a plurality of the other software modules in response to the generation of a successive version of the first output parameter.

16. The method according to claim 15 wherein the data reduction software segment comprises a harvesting software module that receives the diffraction frames and extracts a set of vector directions and intensities of the diffracted radiation therefrom and generates a corresponding reflection dataset.

17. The method according to claim 16 wherein the data reduction software segment further comprises an indexing software module that receives the reflection dataset and determines characteristic indices of the crystalline structure therefrom, the indexing module generating a matrix dataset indicative of said characteristic indices.

18. The method according to claim 17 wherein the data reduction software segment further comprises an integration software module that receives the diffraction frames and matrix dataset and determines a model crystal profile therefrom, the model profile being represented as a raw data dataset.

19. The method according to claim 18 wherein the data reduction software segment further comprises a scaling software module that receives the raw data dataset and corrects for errors and uncertainties therein, the scaling module generating said HKL dataset.

20. The method according to claim 15 wherein the data collection software segment comprises a data strategy software module that receives the HKL dataset and determines optimized data collection parameters that are used by the system in collecting the diffraction frames.

21. The method according to claim 15 further comprising establishing a global parameter list that is accessible to, and updatable by, said software modules.

22. The method according to claim 21 wherein each software module has access to, and updates, only a subset of the parameters of the global parameter list.

23. The method according to claim 15 wherein a software module of the system executes an operation specific to that module automatically upon receiving a modified version of an input parameter of that module.

24. The method according to claim 15 wherein at least one of the software modules assigns a trustworthiness value to an output parameter that it generates that is used to rank its reliability in comparison to other versions of the same output parameter generated by any software module, and wherein a software module having two versions of the same input parameter available may select only the version having the higher trustworthiness value.

25. The method according to claim 15 wherein certain parameters that have an interrelationship are together such that they are received as an input pair, or made available as an output pair, by a software module.

26. The method according to claim 15 wherein a software module may revoke an earlier version of an output parameter if it subsequently generates a newer version of that output parameter, and may broadcast the revocation to other software modules that receive that parameter as an input.

27. The method according to claim 15 wherein certain of the parameters are identified as optional, and a software module will check for the presence of an optional input parameter, but will continue performing an operation using previous inputs if a new optional input parameter is received.

28. The method according to claim 15 wherein the diffraction system comprises an X-ray diffraction system, and wherein the incident beam of radiation comprises an X-ray beam.

* * * * *